Inventor,
Donald M. Ham,
by Francis K. Doyle
His Attorney.

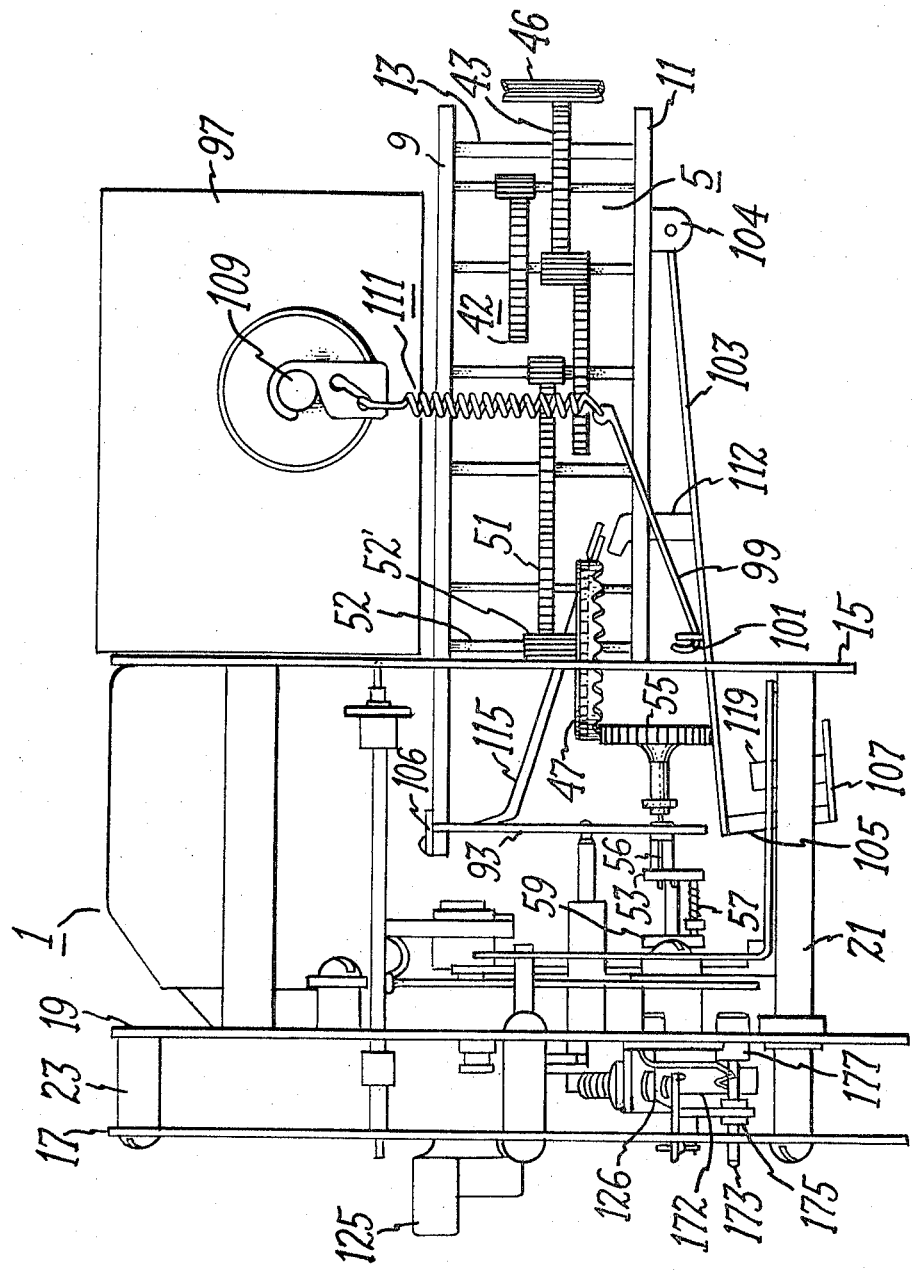

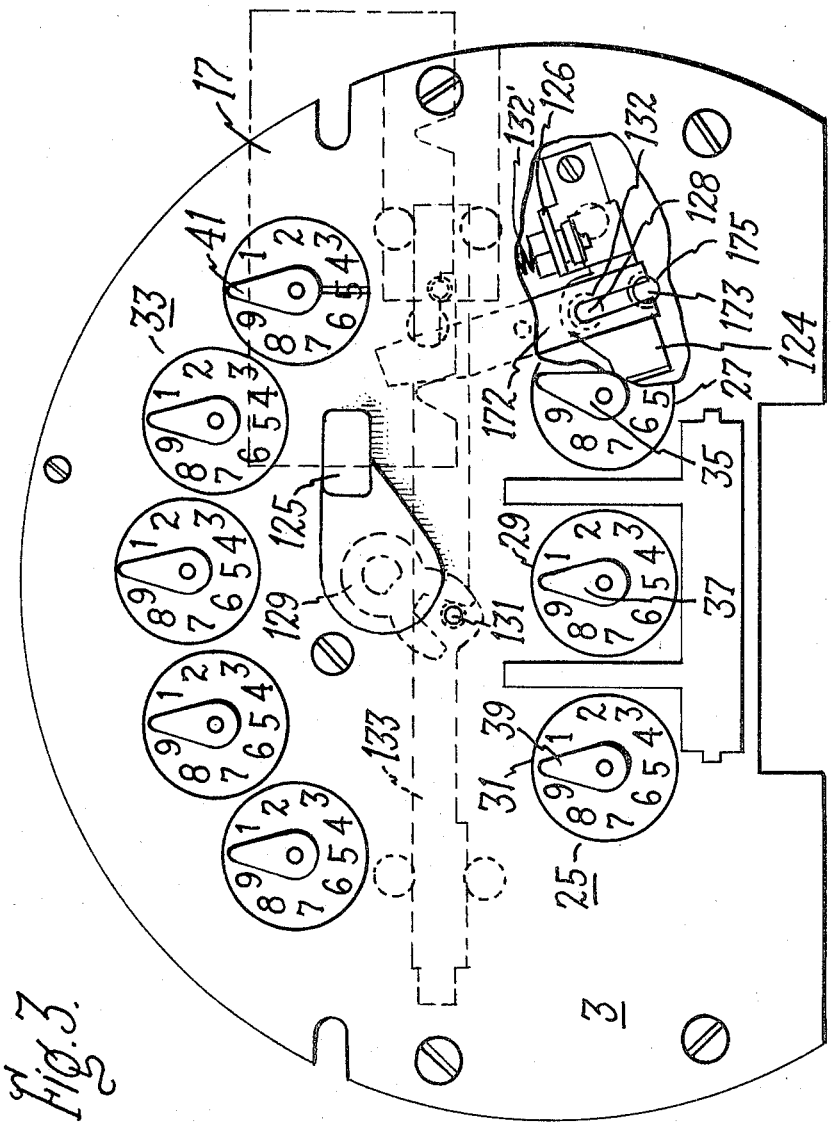

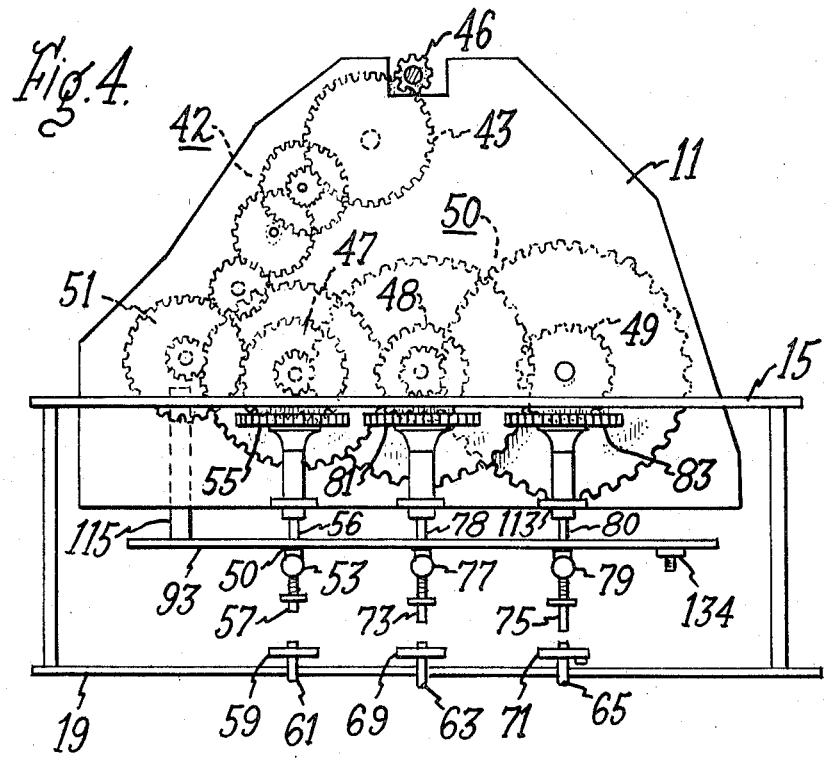
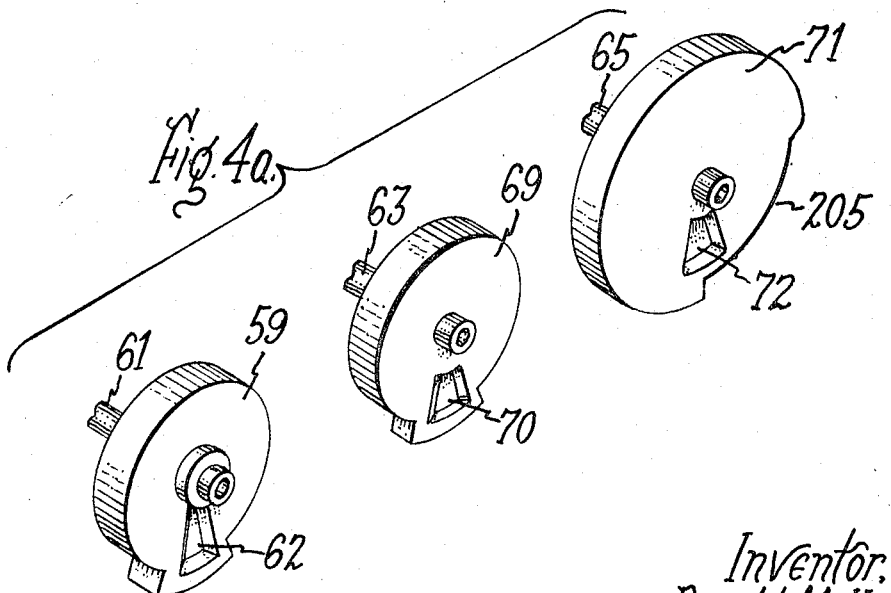

Inventor,
Donald M. Ham,
by Francis X. Doyle
His Attorney.

United States Patent Office 3,423,019
Patented Jan. 21, 1969

3,423,019
RESET MECHANISM FOR MAXIMUM DEMAND
INDICATING METER
Donald M. Ham, Rochester, N.H., assignor to General
Electric Company, a corporation of New York
Filed Feb. 24, 1967, Ser. No. 618,535
U.S. Cl. 235—144                                    6 Claims
Int. Cl. G06c 15/42

ABSTRACT OF THE DISCLOSURE

A reset mechanism for a maximum demand indicating meter which includes a number of dial indicators mounted on separate shafts interconnected by a gear train and driven upscale by driving means coupled to the gear train. The reset mechanism includes a rotatable reset shaft having a cam member and a reset dog mounted for rotation therewith. The reset mechanism also includes a slide bar, operatively engaged by the reset dog, which operates on a pawl and ratchet assembly to drivingly connect a spring drive arrangement to the gear train. Rotation of the reset shaft to a reset position allows the cam member to cam out a plate to decouple the driving means from the gear train and further allows the reset dog to move the slide bar which cocks the drive spring and couples the spring drive arrangement to the gear train through the pawl and ratchet assembly. Retention of the reset shaft in the reset position allows the spring to drive the gear train and dial indicator shafts downscale until a stop device automatically halts rotation of the dial indicator shafts at a zero position.

Background of invention

This invention relates to a demand indicating meter and, more particularly, to a mechanism for resetting the meter at the end of a given time period.

As is well-known to those skilled in the metering art, ascertainment of demand for short intervals is necessary when metering electrical energy over a longer period of time. This type of measurement has been promulgated in an effort to recover the costs of the necessary electrical generating and distributing equipment which is installed by utilities and which must be capable of handling extraordinary peak loads which may be required from time to time by utilities customers. In known demand devices, the extraordinary peaking effects of the individual customer installed are measured by determining the average of the real power required by the customer over the specified short time intervals. Customers having a high-peak demand during such time intervals in comparison to their average load during the entire period are required to pay an added charge based upon this peak demand as their share of the cost of the increased capacity required to be maintained by the utility. An example of such a demand device is the indicating demand register, which indicates the single, maximum demand that has occurred during an interval in a given billing period. Of course, such devices require a mechanism for returning the demand indicator to zero at the end of the period so that a new billing period may be initiated.

The demand registers of the prior art, as represented by Patent No. 3,092,318 in the name of the present inventor, generally include manual reset mechanisms wherein each dial indicator shaft is individually clutched and is individually reset to zero by separate spring-actuated mechanisms controlled by a manually operated reset lever. The shafts will be in correct correlation after reset only if every shaft is returned fully to the zero position. However, in practice, the monthly demand dials can get out of correlation if the manual resetting operation is not performed completely. Additionally, structural problems in the coupling between the dial indicator shafts and the drives therefor may result in jamming or in coupling at the wrong time so that erroneous demand indications may appear.

Summary of invention

It is an object of the present invention to provide a reset mechanism for a maximum demand indicating meter wherein the dial indicators are always maintained in correlation with each other.

It is another object of the present invention to provide a simplified reset mechanism for a maximum demand indicating meter wherein the necessity for clutches between the dial indicator shafts for reset is eliminated.

In accordance with my invention in one form thereof, I provide a demand meter for indicating the maximum demand in successive intervals in a time period which includes dial indicators mounted on driven shafts interconnected by a gear train. The driving means for the shafts is decoupled therefrom and reset to zero at the end of a first interval and will not be recoupled in the next or succeeding intervals until it has been driven upscale to the position it was in before decoupling. A reset mechanism, actuated at the end of the period, includes a rotatable cam which decouples the shafts from the driving means, and a spring driven arrangement which may be connected to drive the gear train to drive the dial indicator shafts downscale. A zero stop bar automatically terminates downscale rotation at a zero position.

Description of the drawings

Other objects and advantages of my invention may better be understood by reference to the following description taken in conjunction with the accompanying drawings in which:

FIGURE 2 is a side elevation view on an enlarged scale of the demand device;

FIGURE 3 is a front view of the demand device on an enlarged scale with a portion broken away, and also showing a standard kilowatt hour register with the maximum demand register;

FIGURE 4 is a bottom view of a portion of the demand register including the drive coupling arrangement therefor;

FIGURE 4a is a perspective view of the slotted disks for the coincident counting register of the demand device;

Detailed description of the invention

Figure 1:
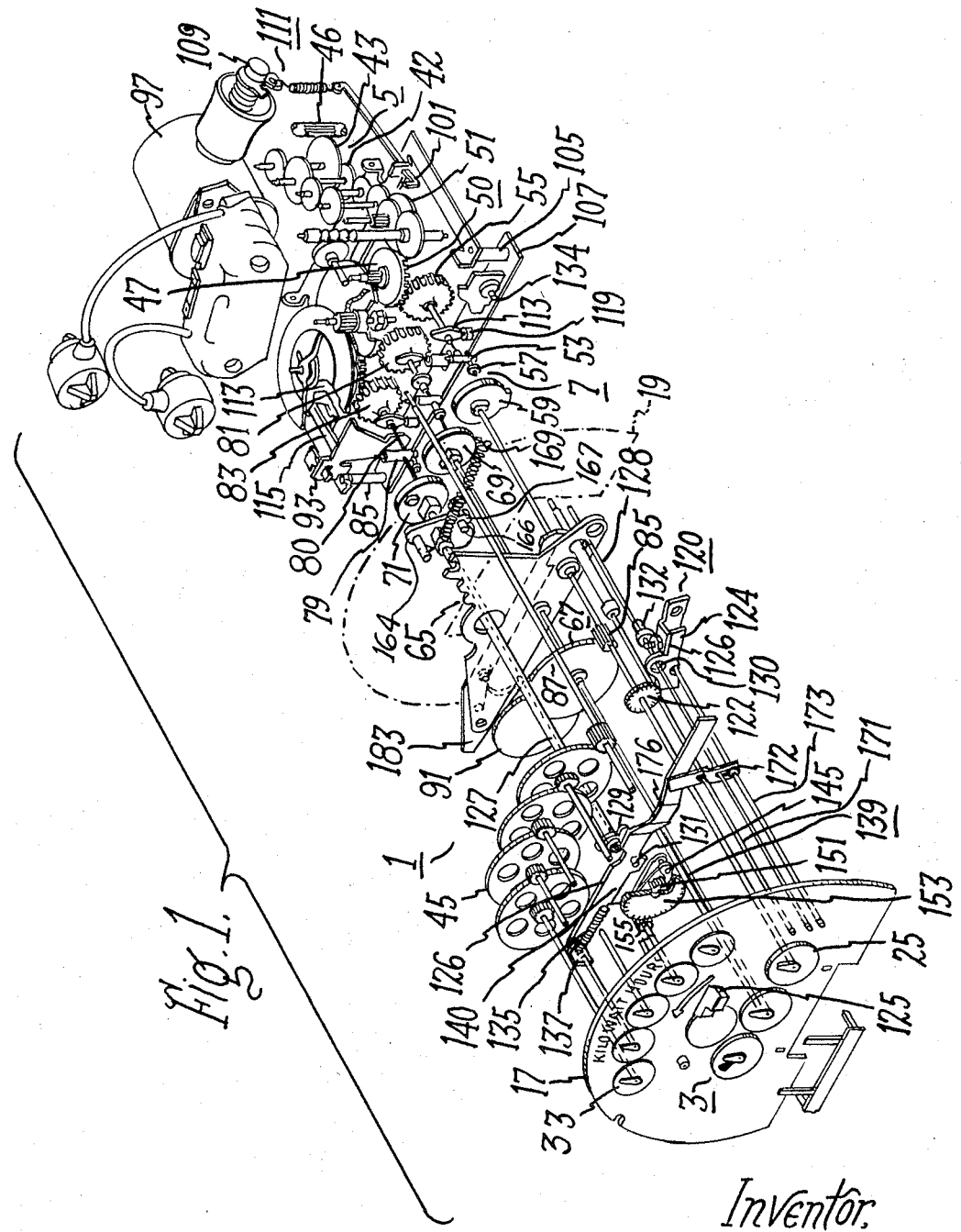
FIGURE 1 is an exploded perspective view of a demand device including the reset mechanism of the present invention.

Referring to FIGURE 1, a maximum demand meter or register 1 is shown including the novel reset mechanism of the present invention. The maximum demand register 1 comprises the maximum demand indicating or counting means 3 which is driven by a driving means 5 in accordance with a demand, in the form of impulses from a watthour meter or the like, which is to be measured. The register 1 is provided with decoupling or clutching means, generally indicated at 7, for coupling the driving means 5 to the indicating means 3. The clutching means 7 is designed so that the driving means 5 will drive the indicating means 3 through a given demand interval and then will be declutched at the end of such interval. Upon releasing the clutch means 7, the driving means 5 will be decoupled from the indicating means 3 until the driving means 5 has been driven to a demand position which equals the demand which is indicated by the indicating means 3. The clutch means 7 can thus be considered a predetermined clutch means since it only acts to recouple the driving means and the indicating means at a predetermined position, the position of the indicating means 3 when it was uncoupled.

As shown more fully in FIGURE 2, the maximum demand meter 1 includes a pair of horizontal support plates 9 and 11 which are fixedly spaced from each other, such as, for example, by being connected to each other by means of spacers 13, only one of which is shown. At the forward end of such spaced horizontal plates 9 and 11 is fixed a vertical plate 15. Connected to the vertical plate 15 are a pair of vertical front plates 17 and 19, the plates 17 and 19 being connected to and spaced from the fixed plate 15 by means of spacers 21, only one of which is shown in this view. Plates 17 and 19 are spaced from each other by means such as spacers 23. The plate 17 has various dials printed thereon which are utilized for recording both the maximum demand indication and the kilowatthour indication. This can more clearly be seen by reference to FIGURE 3, where the maximum demand indicating means 3 is shown as three dials generally numbered 25, the dials being designated as the units dial 27, the tens dial 29, and the 100's dial 31. As will be understood, the dials 25 are usually printed on the front plate 17. Also shown on the front plate 17 are the dials generally numbered 33 which are utilized for registering the kilowatthour consumption of power in the manner well understood by those skilled in the art. These dials 33 cooperate with pointers 41 to indicate the kilowatthour usage.

Referring again to FIGURE 2, there is shown journaled between the fixed horizontal plates 9 and 11, the driving means 5 in the form of a gear train 42, wherein the gear 43 thereof is utilized to take off from a meter disk (not shown) the meter revolutions and to drive both the kilowatthour and the maximum demand register. In general, the gear 43 would mesh with a pinion such as 46, secured to the meter disk shaft in order to take off from such meter the desired disk revolution. The manner of mounting the register on the meter is believed to be well understood by those skilled in the art and, inasmuch as it forms no part of this invention, it is not shown in the drawing and will not be described further.

A conventional kilowatthour register mechanism indicated generally at 45 (see FIGURE 1) is utilized for driving the register pointers 41 of the kilowatthour register. Again, inasmuch as the kilowatthour register forms no part of this invention and since such driving mechanisms are well understood by those skilled in the art, no further description will be made of this portion of the meter.

Referring now to FIGURE 4, the driving mechanism 5 of the demand register 1 includes a series of crown gears 47, 48 and 49 which are rotatably mounted between the fixed horizontal plates 9 and 11. The crown gears 47, 48 and 49 form a part of a gear reduction mechanism 50 which meshes with the gear train 42 to provide the driving means for indicating the total number of demand impulses counted by the mechanism. The crown gear 47 is mounted on shaft 52 which has a spur gear 52' (see FIGURE 2) which meshes with the gear 51 of the gear train 42. The gear train 42 is so designed that the crown gear 47 will rotate in proportion to the total number of demand impulses from a watthour meter which are to be counted by the mechanism. The gear reduction mechanism 50 is coupled to the maximum demand indicating register 3 by means of a mechanical coincidence circuit, to be described.

As can be seen in FIGURES 2 and 4, the crown gear 47 meshes with a gear 55 to translate the vertical rotary motion to horizontal rotary motion in order to drive the dial indicator shafts. The gear 55 includes a rotatable shaft portion 56 which has an index bar 53 eccentrically mounted at an end thereof for rotation therewith. The index bar 53 is provided with a pin 57 which rotates with the index bar to perform a driving function somewhat in the nature of a crank. The gear 55, shaft 56, index bar 53 and pin 57, thus form an integral arrangement. The shaft 56 includes a bearing 58 for mounting in a movable shift plate, to be described, which when moved, causes the entire arrangement to move generally laterally so that the pin 57 on the index bar 53 drivingly engages a disk 59 which is mounted on a unit pointer shaft 61. Of course, the unit pointer shaft 61 drives the unit pointer 35 about the unit dial 27 as will be well understood. The unit pointer shaft 61 is journaled at one end in the front dial plate 17 and near the other end in the rear plate 19. It will be, of course, understood that openings are provided in the other plate such that the pointer shaft 61 and the other shafts may pass through the vertical plates to be journaled on the front dial plate 17.

As shown in FIGURES 4 and 4a the driven disk 59 which is affixed to the unit shaft 61 includes a slot 62 which is engaged by the pin 57 on the driven index bar 53 as hereinbefore described. The tens shaft 63 and the hundreds shaft 65 are journaled in a similar manner in the front dial plate 17 and in the rear plate 19. However, as will be well understood, these shafts 63 and 65 are driven from the unit shaft 61 through a gear reduction mechanism generally indicated at 67 (see FIGURES 1 and 5). Each of the shafts 63 and 65 is provided with a disk 69 and 71, respectively, as is clearly shown in FIGURES 4 and 4a of the drawing. Each of the disks 69 and 71 include slots 70 and 72, respectively, so as to accommodate pins 73 and 75, respectively, which are mounted on driven index bars 77 and 79, respectively. The index bars 77 and 79 mounted on shafts 78, 80 are driven by the crown gears 48 and 49 respectively, through gears 81 and 83 respectively. As hereinbefore pointed out, shaft 63 for the tens pointer 37 and shaft 65 for the hundreds pointer 39 are driven by the unit shaft 61 through the gear reduction mechanism in the form of the gear train 67 (see FIGURES 1 and 5) comprising gear 85 on the unit shaft 61 which drivingly engages gear 87 on the tens shaft 63, and gear 89 on the tens shaft 63 which drivingly engages gear 91 on the hundreds shaft 65. The pins and the slotted disks are not utilized as driving mechanisms but are used as the basis of one form of mechanical coincident circuit which is utilized in the demand register. When the demand register 1 indicates 000, the slotted disks 69 and 71 will track with the pins 73 and 75 as the register 1 counts the demand up from 0. However, the disks 69 and 71 will not be driven by the pins 73 and 75 since the gearing ratio between the driving crown gear 47 and the gears 48 and 49 is similar to that of the gear train 67 between the unit shaft 61 and the tens and 100's shafts 63 and 65 respectively, such that the pins 73 and 75 will ride in the slotted disks 69 and 71 but will not drive such disks. From the above it can be seen that the index bars and the pins are in effect, a counting register, similar to the dials and their pointers, respectively.

Referring again to FIGURES 1, 2 and 4, the demand register includes an interval resetting means which is automatically actuated at either a 15, 30 or 60 minute interval, as desired. The actuating means of the interval resetting mechanism comprises a timing mechanism 97, which operates at the desired interval to initiate an interval resetting action through a linking lever 99. One end of the lever 99 includes a hooked portion 101 which engages a U-shaped lift plate 103 which is hinged to the plate 11 at 104 and is connected by means of pins 105 to a bar 107.

The bar 107 supports three vertically disposed magnets 119. A tab 112 on lift plate 103 is positioned close to and moves into engagement with a tab 115 on shift plate 93, as clearly appears in FIGURE 2. Shift plate 93 carries the bearings, such as 58, for shafts 56, 78 and 80, to which are fastened index bars 53, 77 and 79. The shift plate 93 is pivotally supported at its upper end by the plate 9 at a pivot point 106. The lift plate 103 is biased downwardly by gravity in its normal position (shown in FIGURE 2), thereby allowing the lower half of the shift plate 93 to be pivoted forwardly a small degree, sufficient to allow the pins 57, 73 and 75 on the index bars 53, 77 and 79 respectively, to engage the slotted disks 59, 69 and 71 respectively and to ride in the disk slots 62, 70 and 72 respectively when the indicating means 3 have been driven sufficiently upscale.

At the end of the demand interval, the timing mechanism 97 causes initiation of the interval resetting operation by causing an actuator arm 109 to move upwardly. The arm 109 acts through a spring 111 and lever 99 to raise the lift plate 103. As the lift plate 103 moves up, tab 112 thereon pushes shift plate arm 115 up, thereby causing the shift plate 93 to pivot backwardly about the pivot point 106 so as to disengage the pins 57, 73 and 75 from the slotted disks 59, 69 and 71. The backward motion of the shift plate 93 also demeshes the crown gears 47, 48 and 49 from the gears 55, 81 and 83 on the respectively pin shafts 56, 78 and 93. In this manner pins 57, 73 and 75 may be reset to the 0 position while the indicating register 1 of the meter retains the maximum demand which has already been recorded thereon.

In order to provide the desired resetting of the pins 57, 73 and 75 during the automatic interval reset, a magnetic arrangement is provided. This arrangement includes rotating magnets 113, one magnet 113 mounted on each of shafts 56, 78, 80 and 94 respectively. Resetting magnets 119 are provided on and are disposed along bar 107 which is connected to the lift plate 103. In the normal drive position the reset magnet bar 107 is positioned such that the resetting magnets 119 and the rotating magnets 113 are out of alignment with each other. Upon initiation of the automatic interval reset, the lift plate 103 is pulled up by the linking lever 99 and causes the reset magnet bar 107 to move upwardly while tab 112 moves plate 93 rearwardly so that the resetting magnets 119 are aligned with the rotating magnets 113. Since the gears 55, 81 and 83 are decoupled from the crown gears 47, 48 and 49 at this time, the resetting magnets 119 act upon the rotating magnets 113 so as to rotate the magnets and the associated shafts therefor such that the pins 57, 73 and 75 assume a 6 o'clock position. However, since the slotted disks 59, 69 and 71 have remained in the position that they occupied when the pointer register 3 was disengaged from the pins, the slots 70 and 72 in the tens disk 69 and the 100's disk 71, respectively, will not coincide with the cooperating pins 73 and 75, and the slot 62 in the unit disk 59 will not coincide with the driving pin 57.

At the completion of the reset interval, the actuator arm 109 is released. This drops the lift plate 103, removing the rotating magnets 113 from the influence of the reset magnets 119 and moving the lower half of the shift plate 93 forward. As the shift plate moves forward it moves the pins 57, 73 and 75 forward and allows the crown gears 47, 48 and 49 to remesh with the bevel gears 55, 81 and 83 so that the pins 57, 73 and 75 are once again being driven.

As will be noted from FIGURE 4, the 100's pin 75 is longer than the tens pin 73 and the tens pin 73, in turn, is longer than the unit pin 57. Therefore, when the shift plate 93 moves back toward its normal position, the pin 75, cooperating with the slotted disk 71, will engage a flat part on the back of the disk. This will hold the shift plate 93 away from the normal position a sufficient amount to allow driving clearance between the driving pin 57 and the driven disk 59. In this manner, the reading of the demand register 3 will be retained for the next interval and will not be changed unless the demand in one of the succeeding intervals exceeds the reading presently on the demand register. Of course, the crown gears 47, 48 and 49 and the associated driven gears 55, 81 and 83 will rotate as before and will actually count the demand impulses but these impulses will not be recorded on the demand register 3. However, should the demand in the new interval exceed the reading on the demand register 3, then the pins 73 and 75 will coincide with their slots 70 and 72 in the slotted disks 69 and 71 respectively, and will allow the driving pin 57 to again enter the slot 62 in the driven disk 59 and drive the demand register 3 to record the increase in demand during the interval.

As seen in FIGURES 1, 2, 3 and 5, a brake 120 is provided for the demand register 3 to prevent back-driving of the demand gear train 67 during the demand counting period. The brake 120 engages a star wheel 122 mounted on the units shaft 61. Brake 120 comprises a flat plate 124, pivotally supported at a tab member 124a fixed to the plate 19, and including a portion which brakingly engages the star wheel 122. A first brake actuating pin 128 is journaled in the front and rear plates 17 and 19 and extends through an aperture 130 in the brake plate 124. A shoulder 132 mounted on the pin 128 engages the brake plate 124. The brake plate 124 is biased by means of a spring in a direction normally lockingly engaging the star wheel 122. Movement of the shift plate 93 forward after interval reset causes a brake adjusting screw 134 carried by the shift plate 93 to push the pin 128 forward so that the shoulder 132 thereof moves the brake plate 124 forward and out of engagement with the star wheel 122. Of course, during interval reset, the brake adjusting screw 134 is disengaged from the pin 128 so that the brake plate 124 is in engagement with the star wheel 122 and locks the demand gear train 67.

Figure 5:
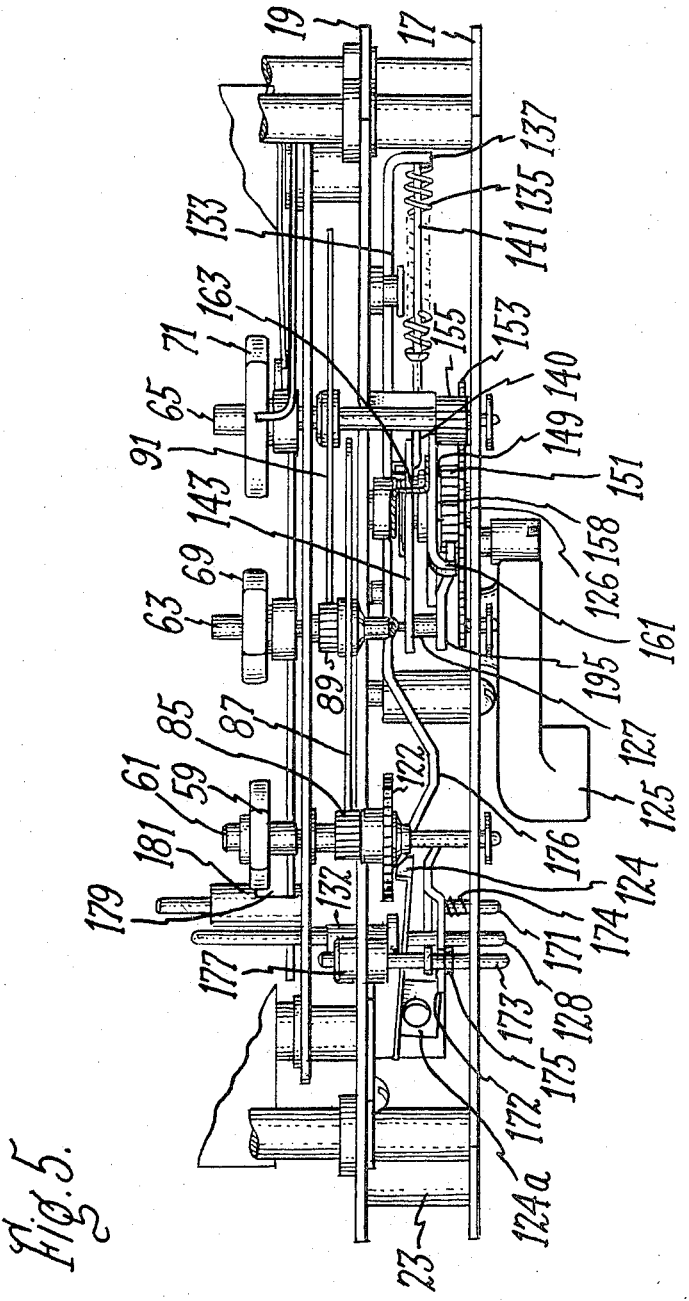
FIGURE 5 is a bottom view of a portion of the demand register including the reset mechanism of the present invention.

The novel monthly resetting mechanism of the demand register is provided in a manner which will now be discussed. The monthly resetting mechanism may be operated to reset the maximum demand register, as well as the coincident counting register, back to zero at the end of a given period. This period will usually correspond to a billing period for the customer. After an operator records the maximum single interval demand for the period appeaing on the demand register, he must operate the resetting mechanism to set the dial indicators back to zero so that the register is ready for the next period. Thus, it can be understood that, while, at the end of an interval, only the coincident counting register must be reset to zero, at the end of a billing period both the coincident counting register and the dial indicators must be set to zero. Also, while the resetting mechanism is referred to as a "monthly" resetting mechanism, it is clearly understood that resetting may be accomplished at the end of any desired number of intervals. Referring to FIGURES 1 and 5, a manually operable reset lever 125 is fixed on a rotatably mounted reset shaft 127. The reset shaft 127 extends back through the front dial plate 17 and the rear plate 19. A reset dog 129 is mounted between the front and rear vertical plates 17 and 19 for rotation with the shaft 127. The dog 129 is adapted to engage a pin 131 on a slide bar 133 so that movement of the reset lever 125 through a small arc at monthly reset will cause the pin 131 and slide bar 133 to horizontally reciprocate. The slide bar actuates a novel drive arrangement 140, to be described next, for couping a motive force or driving means to the demand gear train 67 and for driving the gear train 67 downscale.

Figure 6:
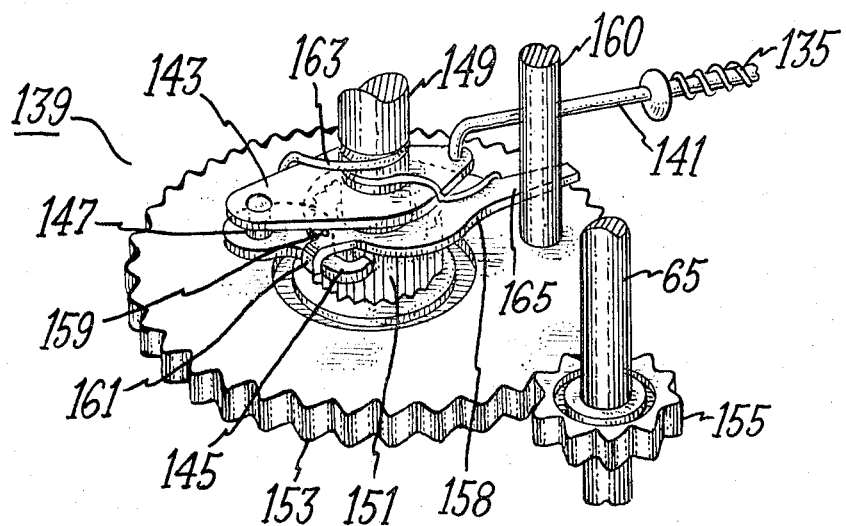
FIGURE 6 is a perspective view of the novel pawl and ratchet assembly for the reset mechanism.

The drive arrangement 140 includes a helical drive spring 135 which is connected to a tab portion 137 of the slide bar 133 at one end thereof. The other end of the coiled spring 135 is adapted to engage a pawl and ratchet assembly 139 best seen in FIGURE 6, which also forms part of the drive arrangement 140 and which serves to couple the drive spring 135 to the demand gear train 67. It is to be clearly understood that the novel drive arrangement 140 of the present invention includes both the motive force or driving means in the form of the spring 135 and the means for coupling the spring 135 to the demand gear train 67 in the form of the pawl and ratchet assembly 139. The spring 135 is wound about a rod member 141, one end of which extends through the slide bar tab 137 and the other end of which engages an arm 143 operatively connected to the pawl 145 by means of a pin 147 which allows relative rotational movement between the arm 143 and the pawl 145. The arm 143 is freely journaled about a shaft 149, journaled between plates 17 and 19. A ratchet member 151 is also freely journaled about the shaft 149 and is fixed to a gear 153 for rotation therewith. The gear 153 drivingly engages a gear 155 fixed on the hundreds shaft 65. A second arm 158 is also freely journaled on shaft 149 and is operatively connected to the pawl 145 by means of a pin 159 which allows relative rotational movement between the arm 158 and the pawl 145. The arm 158 includes a tab portion 161. A spring 163 is provided which is wound about the shaft 149 and one end thereof urges the first-mentioned arm 143 to rotate in a first direction about the shaft 149. The other end of the spring 163 engages the second mentioned arm 158 at an extended portion 165 thereof to urge the arm 158 in an opposite direction about the shaft 149. Post 160 serves to stop the outwardly biased arm 158. The tab 161 on the arm 158 serves as a stop for the outwardly biased arm 143. The opposing forces exerted on the pawl 145 by the two arms 143 and 158 are so selected as to urge the pawl away from engagement with the ratched 151 so that, in a normal position, no motion is imparted to the hundreds shaft pinion 155 from the pawl and ratchet assembly 139. During monthly reset, however, the drive arrangement 140 is actuated so that the pawl 145 is urged into driving engagement with the ratchet 151 through a force exerted on the arm 143 which overcomes the opposing force of arm 158. This force is supplied by the spring 135 which is compressed when the slide bar 133 is reciprocated and acts through rod 141 connected to the arm 143. Additional force built up by further compression of the spring 135 as the slide bar continues its lateral movement is utilized to drive the gear train 67 downscale through the now engaged pawl and ratchet assembly 139.

Referring again to FIGURE 1, a reset cam 164 is also provided and is fixed on the reset shaft 127 between the rear vertical plate 19 and the shift plate 93. The reset cam 164 includes a cam surface 166 which is in operative engagement with an eccentric pin 167 mounted on the shift plate 93 and which serves to cam out the shift plate 93 to decouple the driving mechanism 5 from the indicating means 3 when the reset lever 125 is actuated. A spring 169 normally urges the cam 164 in a clockwise direction as viewed in FIGURE 1, so as to urge the reset shaft 127 in a nonoperative clockwise direction.

Referring now to FIGURES 1, 2 and 5, means are provided to free the brake 120 during monthly reset so that the gear train 67 can be rotated downscale. A second brake actuating pin 171 is provided which spans the front and rear vertical plates 17 and 19 and is spring biased in a direction toward the rear plate 19 by means of spring 174. Mounted on the pin is a tie bar 172 including a slotted portion at one end thereof. The slotted portion is adapted to receive a pin 173 which extends from the front plate 17 to the rear vertical plate 19. The pin 173 includes a pair of shoulder portions 175 which engage opposite sides of the tie bar 173. A nut 177 mounted on a threaded portion of the pin 173 operatively engages the brake plate 124. During monthly reset, when the slide bar 133 is moved to the right, a hump 176 in the slide bar 133 engages the tie bar 172 and cams it forward toward the front vertical plate 17. The movement of the tie bar 172 is transmitted to the pin 173 through the shoulder portions 175 so that the pin 173 is also moved forward, thereby allowing the nut 177 to move the brake plate 124 forward and disengage the brake from the star wheel 122 on the unit shaft 61 so that the gear train 67 can freely rotate downscale.

Means are also provided to insure that the downscale rotation of the demand gear train will automatically terminate at a 000 position on the demand indicator dials. A zero stop bar 183 is used to accomplish automatic termination at the 000 position while allowing uninterfered rotation of the demand gear train 67 until such position is reached. The zero stop bar 183 cooperates, first, with the pin 171 so that it remains clear of the demand gear train 67 during upscale rotation thereof.

The pin 171 includes a cutout portion 179 which includes a pressure surface 181. Since the pin is normally biased toward the rear vertical plate 19, the pressure surface 181 of the cutout portion 179 presses against an end portion of the zero stop bar 183, which is pivoted upwardly when the dial indicator shafts are driven upscale. However, when the reset lever 125 is actuated during monthly reset, the pin 171 is urged forward by movement of the tie bar 172 which is also connected to the pin 171, thereby releasing the zero stop bar 183 and allowing it to move downwardly to stop the downscale rotation of the pointer shafts when a 000 position is reached.

Figure 7:
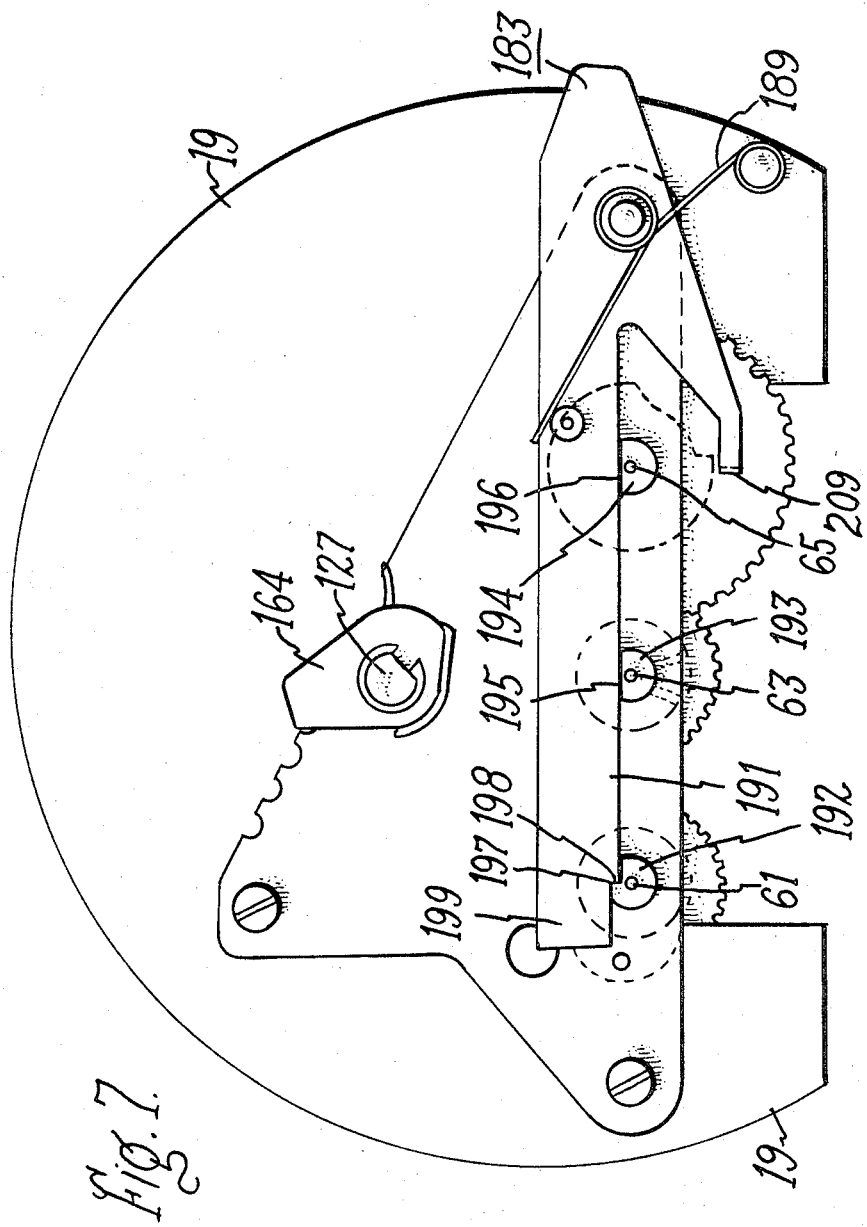
FIGURE 7 is a rear view of a portion of the demand register showing the zero stop bar of the reset mechanism.

Referring to FIGURE 7, the zero stop bar 183 comprises an elongated bar 185 which is pivotally mounted at one end on the rear vertical plate 19 by means of a support pin 187. The zero stop bar 183 is biased by a spring 189 to rotate in a counterclockwise direction, as viewed in FIGURE 7, so that the lower edge 191 thereof rests atop bushings 192, 193 and 194 carried by pointer shafts 61, 63 and 65, respectively. The bushings 193, and 194 on the tens and hundreds shafts 63 and 65 includes flat interference portions 195 and 196 which are oriented in a horizontal position when the respective pointers are at zero position. The bushings 192 on the unit shaft 61 includes a projecting interference portion 197 which extends upwardly when the unit pointer 27 is at a zero position. When the pointer shafts 61, 63 and 65 are being driven upscale the lower edge 191 of the zero stop bar 183 rides on the rounded portion of the bushing 194 on the hundreds pointer shaft 65 so that the bar 185 is oriented at an angle to the horizontal. This allows the free end 199 of the bar 183 to remain clear of the bushings 193 and 192 on the tens and units shafts, 63 and 61. However, during monthly reset the pointer shafts are driven downscale. Since the hundreds shaft 65 first assumes a zero position, the flat interference part 196 of the bushing 194 will be horizontally oriented and allow the zero stop bar 183 to drop down so that the lower edge 191 thereof rides on the tens shaft bushing 193. When the tens shaft bushing 193 reaches a zero position, the flat interference part 195 of the bushing will be horizontally oriented and allow the zero stop bar 183 to drop down further so that the lower edge 191 thereof assumes a horizontal position. At this point the units shaft 61 is completing its final revolution which is terminated when an interference projection 197 comes to the top and meets cutout 198 on the free end 199 of the zero stop bar 183. This terminates the rotation of the unit pointer shaft 61, stopping the unit pointer 35 at zero. Since the three pointers are geared together by the demand gear train 67, the tens and hundreds pointers (which are also at zero at this time) must stop when the unit pointer is stopped. Thus, all three pointers reach zero at the same time and stop at exactly the same time.

The operation for monthly reset of the maximum demand indicating register will now be briefly summarized. As the manually operated reset lever 125 is rotated through a short arc in a counterclockwise direction, the reset cam 164 is rotated, the cam surface 166 thereof operating to move the shift plate eccentric pin 167 down and the shift plate 93 back. This backward motion of the shift plate 93 disengages the driving pin 57 from the driven disk 59 on the unit shaft 61 and disengages the pins 73 and 75 from the slotted disks 69 and 71 on the tens and hundreds shafts 63 and 65, respectively. Further rotation of the reset lever 125 causes the reset shaft 127 to move the reset dog 129 against the pin 131 in the back of the slide bar 133, thereby moving the bar to the right. This motion of the slide bar 133 comprises the spring 135, thereby causing the pawl 145 to engage a tooth of the ratchet 151 thereby coupling the spring and the gear train. Engagement of the pawl 145 and the ratchet 151 permits further motion of the slide bar 133 to further compress the spring 135. As the reset lever 125 is rotated past this point of increased resistance, a raised portion 176 of the slider bar 133 pushes the tie bar 172 of the brake assembly 120 forward. As the tie bar 172 moves forward it carries the brake operating pin 173 forward and nut 177 pushes the brake plate 124 out of engagement with the star wheel 122. At the instant the brake plate 124 is free of the star wheel 122, the demand gear train 67 starts running downscale at a rate determined by the energy stored in the compressed reset spring 135. Because the tie bar 172 is pushed forward, releasing the pressure of the push rod 171 from the zero stop bar 183, the zero stop bar 183 is free to pivot about its axis. As the demand gear train 67 continues to rotate downscale, the zero stop bar 183 rides on the radius of the hundreds bushing 194 and then the tens bushing 193 until the flat interference surfaces 195 and 196 thereof assume a horizontal position, whereupon the zero stop bar 183 drops down to a horizontal position. Downscale rotation is terminated when the interference projection 197 on the unit bushing 192 comes to the stop and meets the cutout portion 198 on the zero stop bar 183.

When the reset lever 125 is manually rotated back clockwise, the slide bar 133 moves back. This re-engages the locking brake 120 with the star wheel 122 before the reset assembly pawl 145 is disengaged from the ratchet 151. The monthly reset is now complete, and the demand pointers are all at zero. If the pins 57, 73 and 75 are at their 6 o'clock position, the brake 120 will unlock and registration of demand begins immediately. Otherwise, the pins are returned to their 6 o'clock position by the next interval reset, and registration of demand begins at that time.

Provision is made to prevent overloading of the dial indicators 25 or any malfunction thereof. Anytime a demand indication registers above a predetermined value, the hundreds shaft 65 is caused to be locked so that it can be neither driven up nor downscale. This provides a ready indication that overloading or a malfunction has occurred. When the hundreds pointer 39 moves into the black sector above position "8" for example, on the hundreds dial 31, a projection 201 on the back of the hundreds disk 71 lifts the stop bar 183 far enough to release the spring-loaded push rod 171. The push rod 171 contacts the shift plate 93 and pushes it back far enough to disengage the pins 57, 73 and 75. This allows the brake 120 to lock. At this point the hundreds pointer 39 is in the black sector. Disengaging the pins and engaging the locking brake prevents further demand from being registered. In order to prevent disengagement of pins 57, 73 and 75 by accidental release of push rod 171, from vibration or shock forces, tab 209 on zero stop bar 183 overlaps the rim of disk 71. Unless the cutout portion 205 of disk 71 is aligned with tab 209, the zero stop bar 183 cannot be rotated far enough to release push rod 171. Cutout portion 205 is aligned correctly only when the indicated demand is above 8 on the hundreds dial.

I have thus described a resetting mechanism for a maximum demand indicating register which comprises a plurality of shafts interconnected by a gear train and having means to drive the shafts upscale. The resetting mechanism includes means for decoupling the upscale drive means from the gear train and a drive arrangement including drive means and means for coupling the drive means to the gear train so that the drive means drives the gear train downscale to a zero position where rotation is terminated by an automatically operating zero stop bar.

What is claimed as new and it is desired to be secured by Letters Patent of the United States is:

1. In a device having a plurality of shafts interconnected by a gear train and having first drive means for driving the shafts upscale from a zero position through said gear train, a mechanism for resetting the shafts, comprising:

(a) means for decoupling said first drive means from said shafts;
(b) a drive arrangement including compressible spring drive means for driving said shafts downscale and including means for coupling said spring drive means to said gear train comprising a normally disengaged pawl and ratchet, said pawl being connected to said spring drive means, said ratchet being drivingly connected to said gear train; and
(c) manually operable means comprising a reciprocal bar operatively engaging said decoupling means and said drive arrangement and movable to a reset position for concurrently actuating said decoupling means and compressing said spring drive means whereupon said spring drive means forces said pawl into driving engagement with said ratchet and drives said gear train downscale to a zero position.

2. In a device having a plurality of shafts interconnected by a gear train and having first drive means coupled to said shafts for driving the shafts upscale from a zero position through said gear train, a mechanism for resetting the shafts to a zero position, comprising:

(a) means for decoupling said first drive means from said shafts;
(b) a drive arrangement including second drive means for driving said shafts downscale and including means for coupling said second drive means with said gear train;
  (1) said second drive means comprises a compressible spring which is connected to said coupling means and which is normally decoupled from said gear train when the shafts are being driven upscale, said spring, upon operation of said manually operable means to a reset position, being first compressed by said manually operable means and then released to act upon said coupling means to effect coupling of said gear train therewith, whereupon said shafts are driven downscale;
(c) manually operable means operatively engaging said decoupling means and said second drive means and movable to a reset position for actuating concurrently said decoupling means and said drive arrangement whereby said second drive means is coupled to said gear train and drives said shafts downscale to a zero position.

3. In a device having a plurality of shafts interconnected by a gear train and having first drive means coupled to said shafts for driving the shafts upscale from a zero position through said gear train, a mechanism for resetting the shafts to a zero position, comprising:

(a) means for decoupling said first drive means from said shafts;
(b) a drive arrangement including second drive means for driving said shafts downscale and including means for coupling said second drive means with said gear train;
(c) manually operable means operatively engaging said decoupling means and said second drive means and movable to a reset position for actuating concurrently said decoupling means and said drive arrangement whereby said second drive means is coupled to said gear train and drives said shafts downscale to a zero position;
  (1) said manually operable means comprises a slide bar which operatively engages said decoupling means and said drive arrangement and which may be caused to reciprocate between a normal reset position when the shafts are being driven upscale and a reset position wherein said slide bar concurrently actuates said coupling means and said drive means.

4. In a device having a plurality of shafts interconnected by a gear train and having first drive means coupled to said shafts for driving the shafts upscale from a zero position through said gear train, a mechanism for resetting the shafts to a zero position, comprising:

(a) means for decoupling said first drive means from said shafts;

(b) a drive arrangement including second drive means for driving said shafts downscale and including means for coupling said second drive means with said gear train;

(1) said coupling means comprises a pawl and ratchet normally disengaged from each other, said pawl being connected to said second drive means, said ratchet being drivingly connected to said gear train, and said pawl and ratchet being so oriented that, upon movement of said manually operable means to a reset position, said pawl is forced into driving engagement with said ratchet by said second drive means;

(c) manually operable means operatively engaging said decoupling means and said second drive means and movable to a reset position for actuating concurrently said decoupling means and said drive arrangement whereby said second drive means is coupled to said gear train and drives said shafts downscale to a zero position.

5. In a device having a plurality of shafts interconnected by a gear train and having first drive means coupled to said shafts for driving the shafts upscale from a zero position through said gear train, a mechanism for resetting the shafts to a zero position, comprising:

(a) means for decoupling said first drive means from said shafts;

(b) a drive arrangement including second drive means for driving said shafts downscale and including means for coupling said second drive means with said gear train;

(c) manually operable means operatively engaging said decoupling means and said second drive means and movable to a reset position for actuating concurrently said decoupling means and said drive arrangement whereby said second drive means is coupled to said gear train and drives said shafts downscale to a zero position;

(d) brake means provided for said gear train to prevent downscale rotation thereof, said manually operable means, when moved to a reset position, engaging said brake means and acting thereon to free said gear train for downscale rotation.

6. In a device having a plurality of shafts interconnected by a gear train and having first drive means coupled to said shafts for driving the shafts upscale from a zero position through said gear train, a mechanism for resetting the shafts to a zero position, comprising:

(a) means for decoupling said first drive means from said shafts;

(b) a drive arrangement including second drive means for driving said shafts downscale and including means for coupling said second drive means with said gear train;

(c) manually operable means operatively engaging said decoupling means and said second drive means and movable to a reset position for actuating concurrently said decoupling means and said drive arrangement whereby said second drive means is coupled to said gear train and drives said shafts downscale to a zero position;

(d) stop means to limit the downscale rotation of said shafts when a zero position is reached, wherein said shafts include interference portions and said stop means comprises a bar normally engaging said shafts at other than said interference portions to allow free rotation thereof, said bar, when said shafts reach a zero position, engaging said interference portions of said shafts to prevent further downscale rotation thereof.

References Cited

UNITED STATES PATENTS

| | | | |
|---|---|---|---|
| 1,933,339 | 10/1933 | Pratt | 324—103 |
| 2,006,321 | 6/1935 | Stark et al. | 324—103 |
| 2,047,376 | 7/1936 | Lewis et al. | 324—103 |
| 2,247,108 | 6/1941 | Witherow | 324—103 |
| 2,259,314 | 10/1941 | Lewis et al. | 235—144 X |
| 2,497,678 | 2/1950 | MacIntyre et al. | 324—103 |
| 3,092,318 | 6/1963 | Ham | 235—104 |

RICHARD B. WILKINSON, *Primary Examiner.*

S. A. WAL, *Assistant Examiner.*

U.S. Cl. X.R.

324—103